US009384283B2

(12) United States Patent
Ball et al.

(10) Patent No.: US 9,384,283 B2
(45) Date of Patent: Jul. 5, 2016

(54) SYSTEM AND METHOD FOR DETERRING TRAVERSAL OF DOMAINS CONTAINING NETWORK RESOURCES

(75) Inventors: Derek Ball, Larkspur, CA (US); Dayton Foster, Calgary (CA); R. Allan MacKenzie, Calgary (CA); Xiaomeng Wan, Calgary (CA)

(73) Assignee: TYNT Multimedia Inc., Calgary (CA)

(*) Notice: Subject to any disclaimer, the term of this patent is extended or adjusted under 35 U.S.C. 154(b) by 502 days.

(21) Appl. No.: 13/089,862

(22) Filed: Apr. 19, 2011

(65) Prior Publication Data

US 2011/0276626 A1 Nov. 10, 2011

Related U.S. Application Data

(60) Provisional application No. 61/342,870, filed on Apr. 19, 2010, provisional application No. 61/282,942, filed on Apr. 27, 2010, provisional application No. 61/344,028, filed on May 10, 2010.

(51) Int. Cl.
  *G06F 15/16* (2006.01)
  *G06F 17/30* (2006.01)

(52) U.S. Cl.
  CPC .... *G06F 17/30867* (2013.01); *G06F 17/30861* (2013.01); *G06F 17/30864* (2013.01)

(58) Field of Classification Search
  CPC ............... G06F 17/30867; G06F 17/30861; G06F 17/30864
  See application file for complete search history.

(56) References Cited

U.S. PATENT DOCUMENTS

| | | | |
|---|---|---|---|
| 6,341,306 B1 | 1/2002 | Rosenschein et al. | |
| 6,567,801 B1 * | 5/2003 | Chiang et al. | 707/E17.013 |
| 6,785,670 B1 | 8/2004 | Chiang et al. | |
| 6,999,916 B2 * | 2/2006 | Lin et al. | 709/217 |
| 7,281,042 B2 | 10/2007 | Hsu et al. | |
| 7,308,439 B2 | 12/2007 | Baird et al. | |
| 7,523,087 B1 | 4/2009 | Agarwal et al. | |
| 7,590,949 B2 | 9/2009 | Yuzawa et al. | |
| 7,797,301 B1 | 9/2010 | Baird et al. | |
| 2002/0112048 A1 * | 8/2002 | Gruyer et al. | 709/218 |
| 2004/0044566 A1 | 3/2004 | Bostelmann et al. | |
| 2005/0027812 A1 | 2/2005 | Bozak et al. | |
| 2005/0086219 A1 | 4/2005 | Martin | |
| 2006/0230058 A1 | 10/2006 | Morris | |
| 2007/0112761 A1 | 5/2007 | Xu et al. | |
| 2007/0130293 A1 * | 6/2007 | Dong et al. | 709/219 |
| 2007/0233692 A1 | 10/2007 | Lisa et al. | |
| 2007/0271255 A1 | 11/2007 | Pappo | |
| 2008/0027707 A1 | 1/2008 | Stefik et al. | |
| 2008/0040389 A1 | 2/2008 | Seth et al. | |

(Continued)

OTHER PUBLICATIONS

Shen et al "Implicit User Modeling for Presonalized Search", CIKM'05, Oct. 31-Nov. 5, 2005, pp. 824-831, Bremen, Germany.

*Primary Examiner* — Thomas Dailey
*Assistant Examiner* — Nam Tran
(74) *Attorney, Agent, or Firm* — Pearl Cohen Zedek Latzer Baratz LLP

(57) ABSTRACT

The present invention provides for a novel method and system for the monitoring of actions by users likely to precede said user leaving the domain of a network resource. Also provided for, is a method and system for the deterring users from leaving the domain of a network resource, a method and system for increasing user traffic to a network resource and a method and system for monitoring trends within a population using network resources.

18 Claims, 3 Drawing Sheets

(56) References Cited

U.S. PATENT DOCUMENTS

| | | |
|---|---|---|
| 2008/0091526 A1 | 4/2008 | Shoemaker |
| 2009/0171907 A1 | 7/2009 | Radovanovic |
| 2009/0172514 A1 | 7/2009 | Radovanovic |
| 2009/0182725 A1 | 7/2009 | Govani et al. |
| 2009/0271388 A1 | 10/2009 | Murdock et al. |
| 2009/0276408 A1 | 11/2009 | Auerbach et al. |
| 2010/0042635 A1 | 2/2010 | Venkataramanujam |
| 2010/0100537 A1 | 4/2010 | Druzgalski et al. |
| 2010/0174703 A1 | 7/2010 | Dandekar et al. |
| 2010/0287170 A1 | 11/2010 | Liu et al. |

* cited by examiner

SYSTEM AND METHOD FOR DETERRING TRAVERSAL OF DOMAINS CONTAINING NETWORK RESOURCES

CROSS-REFERENCE TO RELATED APPLICATIONS

The present Application claims priority from U.S. Provisional Patent Application No. 61/342,870 filed Apr. 19, 2010, from U.S. Provisional Patent Application No. 61/282,942 filed Apr. 27, 2010, and from U.S. Provisional Patent Application No. 61/344,028 filed May 10, 2010, each of which is hereby expressly incorporated by reference herein for all purposes. The present Application is also related to U.S. patent application Ser. No. 12/898,637, which was filed Oct. 5, 2010 and which is hereby incorporated herein by reference.

FIELD OF THE INVENTION

The present invention pertains to the field of data transfer between computer resources communicating by means of a network.

BACKGROUND OF THE INVENTION

All of the publications, patents and patent applications cited within this application are herein incorporated by reference in their entirety to the same extent as if the disclosure of each individual publication, patent application or patent was specifically and individually indicated to be incorporated by reference in its entirety.

In recent years the popularity of computers, and the communication networks established between these computers, have increased dramatically. Such communications networks allow computer users, either in a business, government or personal setting, to communicate with each other, either through a centralized communication point, through a plurality of distributed and redundant communication points, or directly. This allows exchange of information between the computers on the communication network, using a common communication protocol between them. It is common for corporations or business to establish a common communications network between their computers, otherwise referred to as "intranets", in which the communication network has limited or no access to unauthorized persons and/or computers. It is common for intranets to be protected by security systems, such as firewalls, which prevent access by unauthorized users of the communications network, the computers communicating through it, and the information contained within these computers.

The term "Internet" has been adopted to describe the publicly available network which has nearly worldwide coverage, and to which most personal computers have access. The pervasive nature of the Internet, combined with the lower cost and increased performance of personal computers, has led to it being a popular source of information. Systems are available which provide an individual with the ability to search for information or resources within the Internet. By way of non-limiting example, systems exist which allow a user to search for information stored on other Internet computers (e.g., servers), thus providing generalized access to these resources. Unfortunately, when an individual is searching for specific information, the resource on the Internet may not provide the specific information desired by the individual, or else it may provide certain information in an undesired context. The individual may then continue searching, or else use an alternate system to perform the required searching activities. In general, these searching systems provide minimal ability for a user to provide feedback as to the success of the search, or ways for the user to refine future searches. Generally, the user establishes a series of search terms to initiate a search, and upon failure of the search results to provide the user with what he is looking for, the user modifies or adds further search terms in an effort to increase the chance of success on the next search. Alternatively, the user may switch to an alternate search system and attempt to obtain a successful search result using that second system.

Computers communicate within a network using a common set of standards for exchanging data. One common example is the Transmission Control Protocol/Internet Protocol ("TCP/IP") suite. To initiate communications within the communication network, a user (referred to also as a client) may contact another computer on the network (e.g., a server) and request information or a resource. This is facilitated by various software and hardware systems generally available. A user can access resources within the Internet by being directed through software (e.g., by clicking a hyperlink), by entering a Universal Resource Locator ("URL"), etc.

A popular protocol for organizing and sharing information on the Internet via the client/server model is known as the HyperText Transfer Protocol ("HTTP"), and is more commonly referred to in a general sense as the World Wide Web (the web). Generally, the web links information by associating items of interest through the use of HyperText Markup Language ("HTML") files, which reside on servers and usually are transferred to clients via HTTP. A user of the web may traverse it by receiving and viewing an HTML file (or just an image, video, etc.), which may contain within it information or embedded images, but which also may contain information on how to acquire further resources from the web, by, for example, incorporating URLs within the file. This information may be displayed to a user as a combination of text and media (for example images, sound, video) and generally is referred to as a "page" or "web page." Generally, the user uses a client, called a web browser, to interact with the web and the various files found on it (e.g., HTML, audio and video files, etc.). The browser may be implemented through execution of a program operating on a computer, such as a personal computer, cellular telephone or other mobile device.

No central authority exists for cataloguing the hundreds of millions of network resources, such as HTML pages, files or media available within an intranet or the Internet. In general though, there are two approaches taken for finding information or resources of interest within a network: 1) a directory hierarchy and 2) a search engine.

Within a directory hierarchy a web page may be analyzed and categorized, allowing users to scan through various categories, and associated subcategories, to identify resources of interest. Alternatively, a search engine may provide a dataset of terms and phrases (keywords) upon which a user may query, and may return a listing of web resources associated with the keywords. Many such search engines are known in the art, with examples including, but not limited to, Google®, Yahoo® and Alta Vista®.

A search engine generally includes two main parts: an index searcher and an index generator. An index searcher may include a database of indexing keywords of web pages and logic for searching the database. An index generator may include a "spider" for gathering web pages and an "indexer" for generating an index into those pages. Typically, a search engine works by sending out the spider to fetch web pages (by, for example, following the various links that exist on an initial set of web pages). The indexer may then read these pages and create an index based on the words contained in each page. Search engines typically use a proprietary algorithm to create their indices such that, ideally, only meaningful results are returned for each query.

Provided with a page by a spider, an indexer may parse the document and insert selected keywords into the database with references back to the original location of the source page. How this is accomplished depends on the indexer. Some indexers index the titles of the web pages or just the first few paragraphs. Some parse the entire contents and index all words. Some parse available meta-tags or other special hidden tags. Meta-tags are special HTML tags that are meant to provide information about a web page. Unlike normal HTML tags, meta-tags do not affect how the page is displayed. Instead, they provide information such as who created the page, how often it is updated, what the page is about, and which keywords represent the page's content. Many search engines use this information when building their indices.

A common problem for publishers of web pages or creators of network resources is that there is a benefit to keeping users within a given web site, or within a collection of web sites under common ownership; generally this is driven by the acquiring of revenue through advertising presented in conjunction with the content present in the network resource. Therefore it is desirable for a web publisher to attempt to deter a user from leaving a particular web site, or collection of web sites; and instead direct the user to a resource within the given web site or a collection of web sites.

A further issue for those providing content within a network, or those who are reviewing content available on a network, is using network content to derive information on trends within a region, culture, geographical location, country or the world in general. The addition of content, or changes to the search terms used by a population, may represent a change in thought, or increased interest in a population on certain issues, information or opinions. This is highly relevant and valuable information and there are advantages for parties who are able to quickly identify trends or changes to a population's interests, thoughts or opinions.

Many of the computers used today are capable of multitasking, and further provide a variety of user interfaces for controlling various and multiple application programs or system functions simultaneously operating in the computer environment. Personal Computers ("PC") are particularly commonplace, operating with an operating system ("OS") capable of multi-tasking such as Microsoft Windows™ or Apple Computer's MacOS™, or LINUX™ Smaller computing platforms such as held-held computers, personal digital assistants ("PDA"), and advanced wireless telephones may run operating systems capable of multitasking as well.

Users often wish to copy or transfer information or "content" from one program or system function within an OS environment, to another. Using "copy and paste" functions of the application programs and the operating system, the user may select information from a source program (e.g. a Web Browser receiving and displaying information received over an Internet), and "paste" it into the destination program (e.g. a text editing program or document creation program). The copy and paste process is described more fully in U.S. patent application Ser. No. 12/192,391 (20080300859), incorporated by reference, in its entirety, including figures, to the present patent application.

There is a significant interest for those parties making content available on a network, such as an Internet, to provide opportunities for persons accessing a network resource to purchase goods or services as a follow-on action. It is a reasonable assumption that parties accessing a network resource with content relating to a particular topic will be amenable to purchasing goods or services directly or indirectly related to that topic. Therefore advertising is often displayed in association with a network resource generally made available to the public, the advertising displayed selected based upon the content of the network resource, the referral link of the accessing party, the past history of accessing network resources of the party (using, by way of non-limiting example, "cookies" as are known in the art) and combinations thereof, as currently known in the art. This has been further refined in the current art wherein individual words or phrases within the content of the network resource are identified to the party accessing the network resource as differentiated from the majority of the text, so as to entice the party accessing the network resource to "click" or otherwise elect to be transferred from the network resource to another.

It is commonplace that a user is directed to a "landing page" as it is known in the art, or a network resource that presents content which is a logical extension of the advertisement, differentiated word or phrase, or search engine search result. Such landing pages may be static, in that the information presented is the same for all users until modified by a human or automated means; or dynamic, in that the landing page is generated through automated means immediately preceding or contemporaneous with a user accessing the landing page. Dynamic web pages may utilize the referral link driving the user to the landing page, past history of network resource access of the user, geographic location, computer system information, or any other information obtainable on the user in order to generate the landing page. See for example U.S. patent applications #20100042635, #20080027812, #20040044566, #20080040389, #20080091526 and U.S. Pat. Nos. 7,281,042 and 7,523,087; which are herein incorporated by reference, in their entirety.

With respect to the accessing of information through a network, for example an Internet, it is a problem in the present state of the art that people who publish content (text, images, audio, etc.) accessible within a network can easily have their content copied without their knowledge or authorization. The very functionality of the copy and paste within an OS make this easy in the digital world. Industry observers sometimes refer to this as 'atomization' of content.

Tools exist to help content publishers find when their content has been copied and posted on other websites or blogs, however, no tools exist to help content owners learn who is using simple cut and paste functions to copy data from their website within their PC, into products such as e-mail, Microsoft Word™, PowerPoint™ or other programs or system functions. It is currently impossible for publishers to monitor this cutting and pasting process because they have no ability to include attribution with the copied content. With monitoring and tracking, it is possible that publishers of content may be better able to monetize the copying and usage of their published content.

SUMMARY OF THE INVENTION

The present art has suffered from an inability to monitor activities which may precede a user, which is accessing a network resource, leaving of the domain within which the network resource is present. As well, the art has suffered from an inability to utilize information relating to the user's implicit interaction with content presented by a network resource so as to modify presentation of advertisements, create hyperlinks within the content or generate landing pages using the implicit interactions of a user or users.

Certain embodiments of the invention comprise a network resource, a user device and may comprise a network server or other resource. The network resource can include any source of content, including textual content, multimedia—graphics, audio and video content—provided by a media server or obtained from live sources. The user device can comprise personal computers, notebook computers, smart phones, tablet computers, media players, etc. Additional network servers, search engines, social media sites and content sharing systems may be included in certain embodiments. In some embodiments, a network resource may comprise one or more sources of content accessible in single network domain. The network resource may be provided on different servers accessed through a portal. It is contemplated that a single network domain may serve as a portal to other network domains. Thus, a network resource in a first domain can provide an agent to a user device that, responsive to an implicit user interaction, directs users to content which is provided by the first domain, but which is sourced from a second domain.

Certain embodiments of the invention provide systems and methods for monitoring user interactions with a network resource. Certain embodiments comprise a network computing device in electronic communication with a network. In certain embodiments, the first network computing device maintaining content accessible by a user of the network. Certain embodiments comprise a client device in electronic communication with a network. In certain embodiments, the client device configured to receive and display the content. In certain embodiments, the client device is operable to detect an event initiated by the user and associated with a selected portion of the displayed content. Certain embodiments comprise an agent resident on the client device. In certain embodiments, the agent is configured to copy the selected portion of the displayed content in response to the detected event. In certain embodiments, the agent is configured to cause the selected portion of the displayed content to be transmitted to at least one other computing device in network communication with the client device when the selected portion of the displayed content comprises no more than seven words. In certain embodiments, the at least one other computing device is adapted to analyze the selected portion of the displayed content.

DETAILED DESCRIPTION OF THE PRESENT INVENTION

Figure 1:
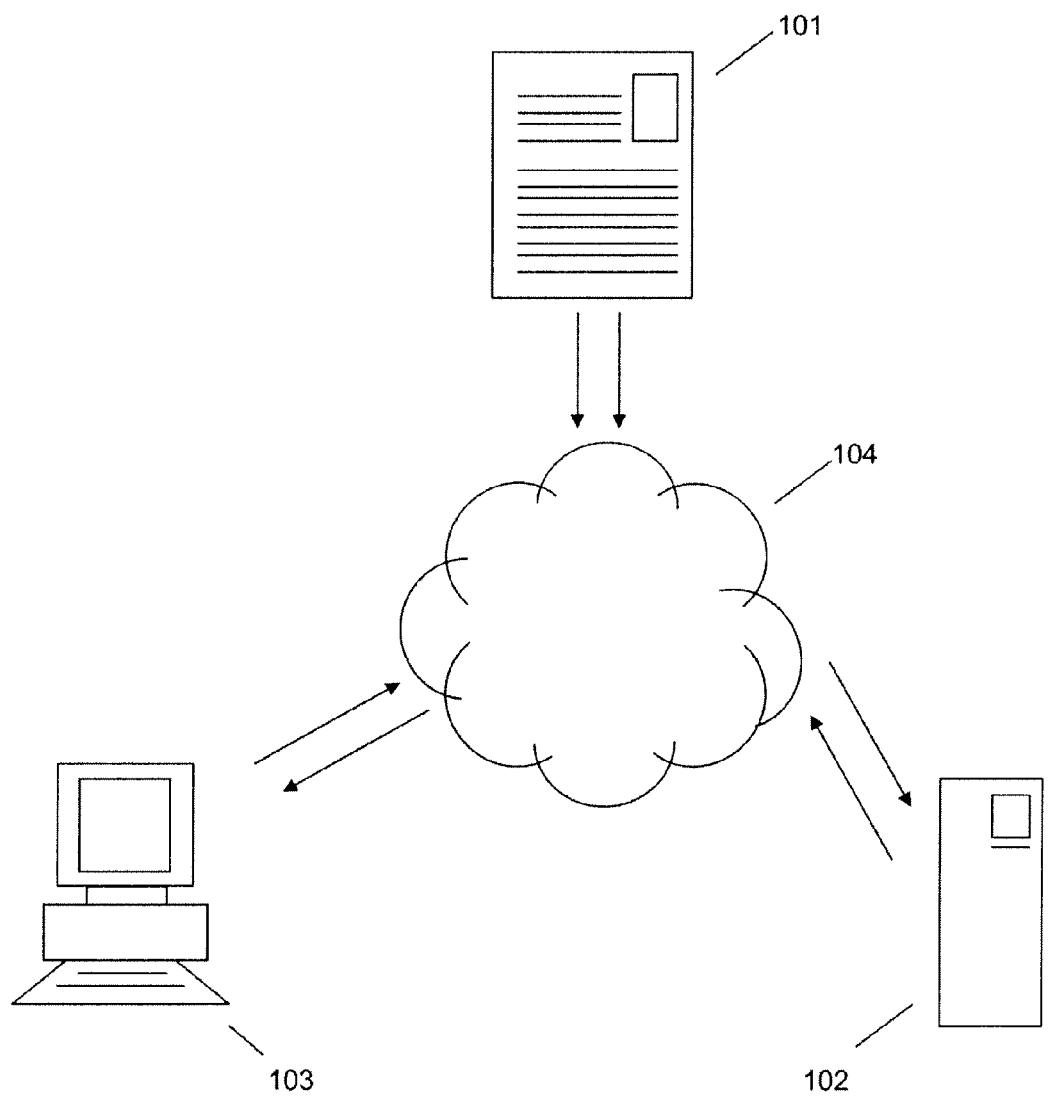
FIG. 1 shows a schematic of the communications flow for a user computer running user interaction detection client software, a RUII server and a network resource (for example, a web page) wherein the user computer is accessing a network resource via a network.

Embodiments of the present invention provide methods and systems for detection of user interaction with network resources accessible within an electronic network which then provides information to a web publisher, web site administrator or web site manager as to particular content it may present to a user so as to prevent the user from navigating to an alternative web site or network resource.

As used herein, "computer" means a machine having a processor, a memory, and an operating system, capable of interaction with a user or other computer, and shall include without limitation desktop computers, notebook computers, tablet computers, personal digital assistants (PDAs), servers, handheld computers, and mobile or cellular phones capable of satisfying the requirements of the present definition and similar devices.

Though the present invention is explicitly contemplated not to be limited to any particular programming language, the JavaScript™ programming language is highly prevalent in many commercially available Internet browsers; and therefore is used as an example of a preferred implementation of the present invention. In certain embodiments of the present invention software code is communicated proximate in time, or concurrent with, the communication to a second computer of a network resource located on a first computer, by way of non-limiting example a web page. The code may contain at least the functions contemplated by the present invention, and the network resource may comprise digital content. The code is typically executed proximate in time to the network resource display on the first computer using a program capable of viewing a network resource, such as a web browser, resulting in a copy command intercept program operating on the first computer capable of interacting with the program capable of viewing a network resource. In certain embodiments, the copy command intercept program is capable of detecting certain actions by a user within at least the program capable of viewing a network resource such as the copying of elements within the network resource, printing of the network resource, selecting elements within a network resource, or copying the URL of the network resource ("implicit user interaction").

In certain embodiments, when a copy command is selected by the user (a "copy event") the copy command intercept program causes the elements selected for copying to be transmitted into the user's copy/paste memory buffer of the second computer, optionally with additional content appended into the memory buffer such additional content being defined by a manager or administrator of the first computer. The copy command intercept program may report implicit user interactions to at least one other computer in network communication with the second computer. The copy event information can be stored in a database for analysis, and such copy event information may comprise what the copied content was, the URL of the original article, the IP address/geographic location of the browser doing the copying, or other information generally known in the art as useful for identifying relevance of information to a user. This information is then used to by the web page manager/administrator to better understand what network resources, or elements within a particular network resource is popular, frequently copied or of increased relevance to the user.

In certain embodiments, the additional content may also be optionally pasted when the user pastes the content subject to a copy event. Where the length of the copied content is below some threshold, as measured by either text string length, or number of words copied (wherein a word is defined as a string or text interrupted by a whitespace character, a hyphen or a dash) then the content is directed to a memory resident on at least one other computer in network communication with the second computer for analysis.

In certain embodiments, when a user undertakes an implicit user interaction with elements within the network resource, the software code presents to the user an offer of at least one hyperlink which leads to a network resource relating to the element subject to an implicit user interaction. In one example, such a network resource may be a landing page relating to the element subject to an implicit user interaction.

In certain embodiments of the present invention, software code is communicated proximate in time, or concurrent with, the communication to a second computer of a network resource located on a first computer. For example, the network resource may be a web page. The code may contain at least the functions contemplated by the present invention, where the network resource may comprise digital content. In certain embodiments, the code may be is executed proximate in time to the network resource display on the first computer using a program capable of viewing a network resource, such as a web browser, resulting in a copy command intercept program operating on the first computer capable of interacting with the program capable of viewing a network resource. The copy command intercept program may be capable of detecting certain actions by a user within at least the program capable of viewing a network resource such as the copying of elements within the network resource, printing of the network resource, selecting elements within a network resource, or copying the URL of the network resource ("implicit user interaction").

In certain embodiments, when a copy command is selected by the user, the copy command intercept program causes the elements selected for copying to be transmitted into the user's copy/paste memory buffer of the second computer, optionally with additional content appended into the memory buffer such additional content being defined by a manager or administrator of the first computer. The copy command intercept program reports implicit user interactions to at least one other computer in network communication with the second computer, the copy event information stored in a database for analysis such copy event information comprising what the copied content was, the URL of the original article, the IP address/geographic location of the browser doing the copying, or other information generally known in the art as useful for identifying relevance of information to a user. This information is then used to by the web page manager/administrator to better understand what network resources, or elements within a particular network resource is popular, frequently copied or of increased relevance to the user.

When the user pastes the content subject to a copy event, the additional content may optionally be pasted as well. If the length of the copied content is below some threshold, as measured by either text string length, or number of words copied (wherein a word is defined as a string or text interrupted by a whitespace character, a hyphen or a dash) then the user may be offered the opportunity to search within the current web site, or a larger set of websites, using the copied content as a search term; wherein the larger set of websites optionally selected by the web publisher, the manager of the network resource, web master, or other person generally in control of the material forming a network resource.

User Experience

The following description describes one example of the user experience provided by the present invention. User experience is described for a first user accessing a network resource using a network, such as an Internet; a second user; and a network resource administrator, such as a website administrator, who receives information on the content viewed and/or copied by the first user.

In certain embodiments, a first user associated with a copy-event may follow a sequence of actions and experience events as follows. The first user, while viewing a network resource such as a web page, decides to copy some content from the web page. Accordingly, the first user selects the content and initiates a copy by, for example, [control C] or [Apple C], right click and selection of a 'copy' command, choosing "Copy" from the main menu, etc. The user can then paste the content into a document such as word processing, email, note pad, etc. The original, selected content is then pasted, optionally with additional information as specified by the owner of the site being copied from. An example of this additional information is a link back to the original article and some attribution text. A particular example of this might be:

[content for which copying is requested]

South Africa's problems, along with other factors like rising crime and relatively low pay, are pushing many physicians out. Some, like Dr. Craig Laurence, feel Canada's pull. In March, Laurence

[additional information]

Click here to read the original article at http://wvvw.calgaryherald.com/Alberta+bound+South+African+doctors+comin g+Canada/1063582/story.html#ixzz0QvJ417Nx The Calgary Herald—Calgary's Best Source For News!

The additional information element '#ixzz0QvJ417Nx' represents a unique generated ID generated at the time of copying the content, which when combined with the program of the present invention operating on the user computer allows the highlighting of copied content when the URL present in the additional information is accessed. This is enabled by way of communication of the unique generated id by the program of the present invention operating on a user computer, to a computer in network communication with it, wherein:

The program of the present invention operating on a user computer communicates the unique id to a second computer in network communication with it, The second computer, which had received and stored the unique generated id along with the content copied by the first user when the first user undertook the copy action, retrieves the content copied by the first user and communicates this to the second computer, The program of the present invention operating on a user computer then modifies the network resource displayed to the second user so as to identify the original content copied by the first user, for example by highlighting the originally copied content.

Using the uniquely generated ID to identify which portion of the network resource was originally copied (such event generating the unique id) said program of the present invention operating on a user computer receiving that information and then applying a highlighting or other format change to that element.

With respect to a second User who uses the link optionally included in the additional information, the web page may load with the copied content highlighted for the user to see the context. With respect to a web site manager/administrator for the site which provided the network resource, or other party interested in user interactions with the network resource, as described herein. The manager/administrator may be informed directly by electronic communication of the existence of an interaction with the network resource. The collection, summarizing and electronic communication of a multiplicity of user interactions may be automated for access by a web site manager/administrator at some later time. Such data may comprise:

a. The number of times elements within the network resource are copied b. The most copied elements within a web page c. The number of times links generated as a result of appending information as part of a copy-event are then viewed by the same or different user as distinguished by their IP address d. The geographic location of the user who undertook the copy-event e. A "tag cloud" of most commonly copied elements in a time period With respect to copied content, of which the length of the copied content is below some threshold, the frequency of the occurrence of such content, or parts thereof, may be assessed and provided to the manager/administrator. In certain embodiments, the frequency of particular copied content, or parts thereof, meeting a threshold value according to certain aspects of the invention, are presented in a graphical format, such as a two dimensional matrix where the frequency of copying is represented as a color, i.e. a "heat map".

In certain embodiments, the presentation of content copied by users, wherein the content is below some threshold length is a surrogate representation of content which is being utilized by users to form part of, or the entirety of, search terms to be used within a search engine accessing network resources. With respect to an Internet, such a search engine will access, as a default, most if not all of the network resources generally available to users of an Internet. Therefore, there is a strong likelihood that the user will be directed by the search engine to a network resource external to the web site presenting the network resource copied from.

Although certain network resources that may remain available through an Internet for the benefit of users, the provision of many network resources is supported in whole or in part through revenue generated by presenting advertising in conjunction with the network resource. This revenue is based on a number of factors, such as frequency of network resource viewings, average length of time users access any given network resource, the number of unique IP addresses accessing a network resource over a given period of time, etc. Therefore, revenue for the provider of the network resource (for example, including but not limited to a Web page manager, administrator, or web publisher) is directly related to the number of users that access the network resource. Efforts are made by providers of network resources to increase the number of users accessing their network resource, which is colloquially referred to as "traffic". Increased presence in search engine results, earlier presentation within search engine results, mention in other network resources, and hyperlinks within other network resources, all increase traffic.

There are also efforts by providers of network resources to direct users to network resources to which they will generate advertising revenue; such as to a network resource under a common domain as the originating network resource, a network resource present on a domain under common control, or a network resource under the control of another party but with whom an agreement for revenue sharing or other consideration is paid. Thus, there is an advantage to a provider of network resources identifying user behaviour which may result in a reduction of traffic within the domain or a collection of domains in which there is a relationship, by way of non-limiting example, advertising revenue sharing. In certain embodiments, the act of copying text strings below a certain threshold is, a substantial amount of the time, for the purpose of using the text to form, in whole or in part, a text string for use in a search of network resources by a search engine. Certain embodiments of the invention provide systems and methods for monitoring user interactions with network resources, specifically the copying of elements within a network resource. Further, the copying of textual elements below a particular threshold can be monitored and presented to the provider of network resources. Increased frequency of words or phrases forming part of the copied content may be assessed, and the provider of a network resource may then include information or references within the network resource to additional information within the network resource, within the domain the network resource is made available, or within other domains which the provider of the network resource would like to direct traffic to.

In certain embodiments, a provider of a network resource may attempt to intervene or otherwise interrupt the user's insertion of the copied content into a search engine of the user's election. For example, the provider of the network resource may automate a process occurring contemporaneous with viewing of a network resource, wherein copying of content under a certain threshold results in the user being presented the opportunity to use the copied content as search terms for searching within the current domain, a selection of domains elected by the provider of the network resource, or the general network but with domains elected by the provider of the network resource given increased priority upon presentation to the user.

In certain embodiments, a provider of a software application for use in viewing network resources may attempt to intervene or otherwise interrupt the user's insertion of the copied content into a search engine of the user's election. For example, the provider of the network resource may automate a process occurring contemporaneous with viewing of a network resource, wherein copying of content under a certain threshold number of elements results in the user being presented the opportunity to use the copied content as search terms for searching within the current domain, a selection of domains elected by the provider of the network resource, or the general network but with domains elected by the provider of the network resource given increased priority upon presentation to the user.

In certain embodiments, the threshold number of elements, as measured by the number of words copied (wherein a word is defined as a string or text interrupted by a white space character, a hyphen or a dash) is seven words or less.

Certain embodiments of the present invention may be used to improve a user's experience when viewing a network resource. As the copying of words below a certain threshold is, as contemplated herein, associated with an intent of the user to perform specific acts; specifically , in a preferred embodiment, the copying of words below a certain threshold preceded search activities being undertaken by the user; and therefore the web publisher, manager or web master is provided an opportunity to change the workflow of the user, prior to the user leaving the network resource, or network resource domain, to undertake a web search. Thus, upon detection of the copying of words below a certain threshold, a user may:

Be presented content related to the copied text as determined by an automated text search of a subset of all network resources generally available, or a set of network resources within a network domain or collection of network domains;

Presented advertisements pre-selected for display in conjunction with the copying of certain text;

Be presented content related to the copied text as determined by a search of a subset of all network resources generally available, or a set of network resources within a network domain or collection of network domains using search techniques or search engines as known in the art;

Presented network resources related or relevant to the copied text; or

As previously described, offering of search functions to the user using the copied text as a search element;

or combinations thereof.

Assessment of users undertaking an implicit user interaction with elements present in a network resource may be used to further enhance the user experience within the network resource by offering up, or access to, additional network resources; or alternatively to direct or present to users network resources from which the publisher, manager or administrator of the network resource may generate additional revenue. It is contemplated that the network resources from which the publisher, manager or administrator of the network resource may generate additional revenue from include, but are not limited to, landing pages.

The means by which a user is directed to, or offered up, network resources from which the publisher, manager or administrator of the network resource may generate additional revenue may be any those currently known in the art. It is contemplated by the present invention that these include:

- a "pop-up-window" as it is known in the art, operating within the program capable of viewing the network resource;
- a hyperlink created within the network resource, identified in a manner consistent for hyperlinks within the program capable of viewing the network resource;
- a representation of a hyperlink in a manner different than hyperlinks are generally represented within the program capable of viewing the network resource;
- the generation of a graphic, distinct from the network resource, which offers the user to access network resources from which the publisher, manager or administrator of the network resource may generate additional revenue;
- on presenting the opportunity to access the network resource upon a user undertaking a "mouse-over" event on an element within the network resource; or
- the presentation within the network resource of a frame offering the user to access network resources from which the publisher, manager or administrator of the network resource may generate additional revenue.

In certain embodiments, the network resources from which the publisher, manager or administrator of the network resource may generate additional revenue may be a landing page; such landing page generated following the identification of elements within a network resource subject to implicit user interactions (based on frequency, or other means as contemplated herein), the landing page pre-existing and linked to by virtue of the elements subject to implicit user interactions, or the landing page dynamically generated by means generally known in the art.

In certain embodiments, the content of additional network resources presented to, or offered to users, or in the alternative the network resources from which the publisher, manager or administrator of the network resource may generate additional revenue; may include, by way of non-limiting example:

- Related content from the initial network resource
- Related content from a web feed or aggregated web feed, by way of non-limiting example, those made available by service providers such as Yahoo!
- Display or text ads related to the content of elements copied by the user or subject to an implicit user interaction
- Search results from a search engine relating to the of elements copied by the user or subject to an implicit user interaction, or subject to past copying or implicit user interaction from persons other than the instant user, where the searched network resources may be limited to network resources within the domain of the network resource, within a subset of domains containing network resources, or for all generally available network domains
- Similar network resources as suggested by the publisher, manager or administrator of the network resource; or their agents were the network resources may be limited to network resources within the domain of the network resource, within a subset of domains containing network resources, or for all generally available network domains
- Images contained in, or comprising network resources, where the network resources may be limited to network resources within the domain of the network resource, within a subset of domains containing network resources, or for all generally available network domains
- Other content discovery objects such as a flash presentation of engaging, popular or related content
- Promoted content that is not directly related to the search copy
- Contextual content or ads based on the demographic profile of the user that was directed to the landing page In certain embodiments, the past history of a user can be used advantageously to improve the relevance of the additional network resources offered to users, or in the alternative the network resources from which the publisher, manager or administrator of the network resource may generate additional revenue. This may be implemented by identification of the referral link (if any) which brought the user to a network resource implementing aspects of the present invention; or by "cookies" as known in the art, which enable the monitoring of past user history; the elements within the network resource subject to an implicit user interaction; the elements within the network resource that have been subject to an implicit user interaction by other users; or combinations thereof.

The identification of a user's implicit interaction with elements contained in a network resource, the particular example contemplated herein being a user's copying of elements within a network resources, wherein the content is below some threshold length; is contemplated by the inventors to be an embodiment of the present invention for identification of a user's intent to undertake a search of network resources and to use this information to improve the user experience, increase the likelihood of maintaining that user within a domain or subset of domains of network resources, or increase traffic to a network resource. Alternatively, monitoring the implicit interactions of a multiplicity of users with network resources, as contemplated herein, can provide contemporaneous information as to content or elements that users are finding relevant within a network resource, where an implicit user interaction is approximated as an expression of relevance of that content or element.

Therefore, in one embodiment of the present invention, the elements or content of network resources subject to an implicit user interaction is monitored identify trends within a population of users. This may be undertaken through monitoring of changes in the presence of certain keywords within the elements or content subject to an implicit user interaction, frequency of users undertaking an implicit user interaction, or particular form thereof; or combinations. There are examples in the prior art of using search terms or search queries within a set of network resources as a means of identifying trends within a population. The present invention has significant advantages over the prior art, in that the monitoring occurs using the implicit user interactions rather than an explicit action of the users (i.e. entering of a search term).

Further, the elements or content of network resources subject to an implicit user interaction may be retained and correlated to:
  time;

location or derived information relating to the user undertaking the implicit user interaction (such location determined by means of a "cookie", a required login of the user to access the network resource, or by the IP address of the user accessing the network resource);

URL of the network resource subject to the implicit user interaction; or the content or portions thereof of the network resources subject to the implicit user interaction;

which can provide historical data for analysis.

In certain embodiments, the content or elements subject to an implicit user interaction, or the network resource from which they originated, may be parsed into a library of keywords; which are then correlated to time, location or derived information relating to the user undertaking the implicit user interaction, the URL of the network resource subject to the implicit user interaction, or the content or portions thereof of the network resources subject to the implicit user interaction; which can provide historical data for analysis.

There are many means known in the art for analyzing changes in keyword frequency arising from search terms used to query a population of network resources (referred to in the art as an internet search record), or more generally trend analysis engines using population actions as an input and the present invention contemplates that these means will be equally as capable of monitoring the presence, increased presence, or frequency of keywords occurring within elements or content subject to implicit user interactions. See for example the trend analysis methods and systems contemplated in U.S. patent applications #20090182725 or #20100100537; which are herein incorporated by reference. It is contemplated by the present invention that the trending of quantity or frequency of implicit user interactions, with or without comparisons to or inclusion of keyword presence in search reports, may be graphically represented as a timeline or presented using algorithms as known in the art.

Though the present invention is not limited to implementation with a particular network resource user interaction detection system, it is contemplated that, in one embodiment, the detection system capable of identifying and communicating user interactions with a network resource will maintain the occurrence of, content of, or particular terms contained within any text elements subject to a user interaction as part of the user interaction detection (Relevant User Interaction Information or "RUII") separate from the user computer, with at least one computer acting as a centralized server. The central server may receive a query from a client program executed by a user computer, wherein the query may contain, at a minimum, the URL of the network resource being viewed on the user computer. The central server may then respond to the query as to whether there exist RUII associated with the URL of the network resource. The benefits of this particular structure, in particular with the method and system for increasing relevance of search results within a network, is the ability to collate, collect, or scan RUII from a multiplicity of users with at least one computer acting as a centralized service provider.

In one embodiment the user interaction detection system is based upon a RUII server in network communication with a user computer, whereby the RUII server receives RUII from a client software application running on the user's computer. The system may store the RUII of a user, optionally together with formatting information which may localize the user interaction within the network resource, on a RUII server separate from the web server hosting the network resource.

FIG. 1 shows a schematic of the relationship between user computer 103 containing user interaction detection client software, and RUII server 102, wherein a portion of a network resource 101 (e.g., a web page) is subject to a user interaction by the user on user computer 103. It is explicitly contemplated that user interaction may be with a variety of network resources, including but not limited to application specific documents, video content, audio content or databases. The communication between user computer 101, RUII server 102 and network resource 101 may be through a network 104 (e.g., the Internet). In the user interaction detection system contemplated by the present invention, the RUII server 102 communicates with user computer 103 through a client program within user computer 103, where the client program is in network communication with RUII server 102.

In certain embodiments, the user interaction detection software may be resident on the user computer, operating either in conjunction with a program or in an environment within a program capable of accessing and displaying network resources and interpreting and effecting computer-readable instructions, including, but not limited to instructions written in Java®, JavaScript, or programming instruction languages particular to a certain web browser, etc. Installation of the user interaction detection software may be by a user such that the software is normally resident upon the computer and is available to the user upon each use of the software capable of accessing or displaying for a user network resources (e.g., a web browser).

Figure 2:
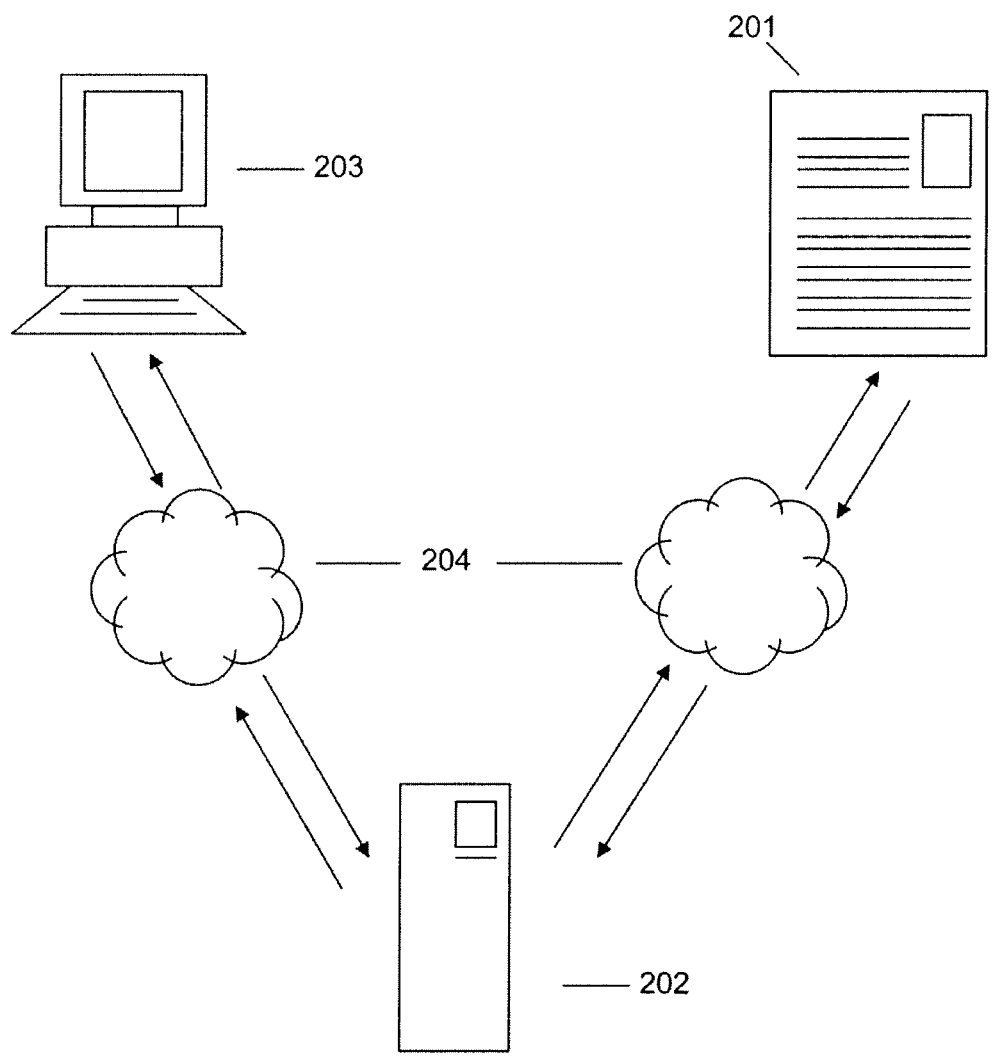
FIG. 2 shows an alternative means of delivering user interaction detection software to the user computer.

In certain embodiments, the user interaction detection software may be delivered by means of a network proxy, as depicted in FIG. 2. In this instance, the user interaction detection client software may run within the network browser environment (e.g., via JavaScript), and may be loaded on a per-page basis using a proxy server. In this embodiment, user computer 203 may seek access to network resource 201, wherein the access to network resource 201 is routed through proxy server 202, with proxy server 202 accessing network resource 201. User computer 203, network resource 201 and proxy server 202 all may be in network communication through means of a common network 204 (e.g., the Internet). Network resource 201 may be obtained by proxy server 202 and passed on to user computer 203, together with computer software code capable of interpretation and operation within the user computer 203. The software code when executed implements the processes and functions described and contemplated as the present invention, specifically the detection of user interactions with a network resource and communication of RUII as more fully described herein.

Generally, proxy server 202 only communicates user interaction detection software code prior to, or following, transmission of the originally requested network resource 201. The user interaction detection software then may be executed within the program operating on user computer 203 that is responsible for the accessing and display of network resource 201.

Figure 3:
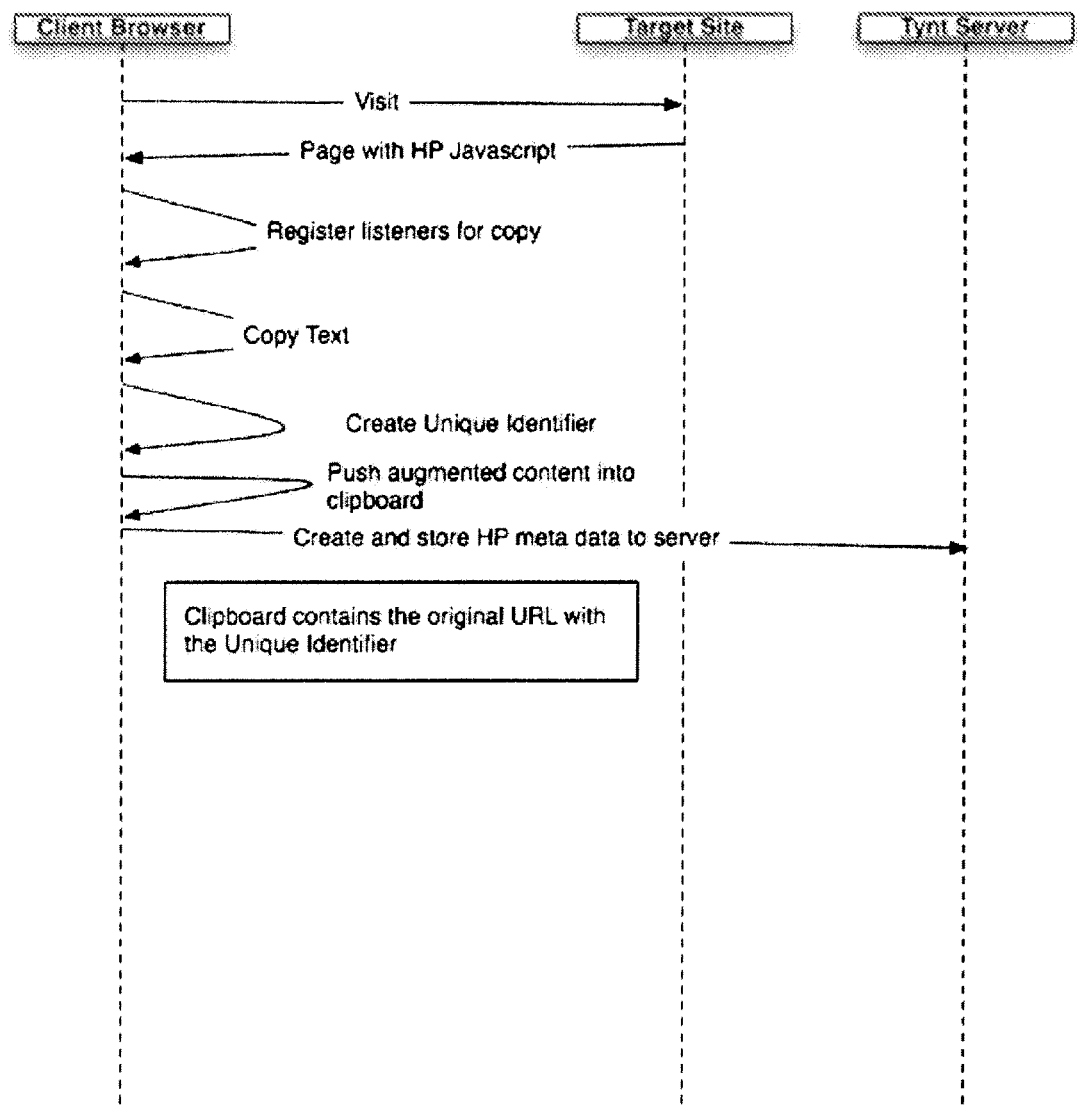
FIG. 3 shows a schematic of the communications flow between the Network Resource Provider (for example, web page) the user client software (Client Browser) and the RUII server upon accessing a network resource.

FIG. 3 illustrates an embodiment of the communication process by which the client software present on the user computer ("Client Browser") may provide information on user interactions to the RUII server. Each network resource may carry with it a unique page identifier, for example a URL, which may be used for cataloguing RUII associated with the network resource. As the network resource is accessed on the user computer, client software (Client Browser) may communicate the page identifier to the RUII server, optionally together with a unique identifier code for the user computer, or alternatively for the client software (user ID). Software code capable of being executed on the user computer or within a program on the user computer, such as a client browser, for implementing for altering and reporting the occurrence of the user interactions contemplated by the present invention ("HP Javascript") may be provided by the network accessible computer providing the network resource ("Network Resource Provider") as presented in FIG. 3. Alternatively, the HP Javascript may be obtained from a computer other than the Network Resource Provider, including the RUII Server or other network accessible computer (not pictured) via a direction given by the Network Resource Provider to the Client Browser.

Optionally, information ("supplemental information") may be communicated to the client for presentation to the client through the client browser. Supplemental information may include, but is not limited to, general information thought to be of relevance to the particular network resource being viewed, an annotation associated with the network resource, or a given user ID. In one embodiment supplemental information may be an advertisement expected to be relevant to the user. In an alternative embodiment, supplemental information may be a link to an alternative network resource. Following the user interaction, if optional supplemental information has been received by the client, the supplemental information may be rendered together with the network resource for the user to view. Further, the substance and form of the supplemental information may be determined by the RUII, under direction of the RUII server or another computer in network communication with the user computer.

The various systems, modules, etc. described herein may each include a storage component for storing machine-readable instructions for performing the various processes as described and illustrated. The storage component may be any type of machine-readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermomechanical memory (e.g., scanning-probe-based data-storage), or any type of machine readable (computer-readable) storing medium. Each computer system may also include addressable memory (e.g., random access memory, cache memory) to store data and/or sets of instructions that may be included within, or be generated by, the machine-readable instructions when they are executed by a processor on the respective platform. The methods and systems described herein may also be implemented as machine-readable instructions stored on or embodied in any of the above-described storage mechanisms.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention comprise a network resource, a user device and may comprise a network server or other resource. The network resource can include any source of content, including textual content, multimedia—graphics, audio and video content—provided by a media server or obtained from live sources. The user device can comprise personal computers, notebook computers, smart phones, tablet computers, media players, etc. Additional network servers, search engines, social media sites and content sharing systems may be included in certain embodiments. In some embodiments, a network resource may comprise one or more sources of content accessible in single network domain. The network resource may be provided on different servers accessed through a portal. It is contemplated that a single network domain may serve as a portal to other network domains. Thus, a network resource in a first domain can provide an agent to a user device that, responsive to an implicit user interaction, directs users to content which is provided by the first domain, but which is sourced from a second domain.

Certain embodiments of the invention provide systems and methods for monitoring user interactions with a network resource. Certain embodiments comprise a network computing device in electronic communication with a network. In certain embodiments, the first network computing device maintaining content accessible by a user of the network. Certain embodiments comprise a client device in electronic communication with a network. In certain embodiments, the client device configured to receive and display the content. In certain embodiments, the client device is operable to detect an event initiated by the user and associated with a selected portion of the displayed content. Certain embodiments comprise an agent resident on the client device. In certain embodiments, the agent is configured to copy the selected portion of the displayed content in response to the detected event. In certain embodiments, the agent is configured to cause the selected portion of the displayed content to be transmitted to at least one other computing device in network communication with the client device when the selected portion of the displayed content comprises no more than seven words. In certain embodiments, the at least one other computing device is adapted to analyze the selected portion of the displayed content.

In certain embodiments, the event initiated by the user comprises a mouse-over event. In certain embodiments, the event initiated by the user comprises a copy event. In certain embodiments, the network computing device is embodied in a network server. In certain embodiments, the agent generates search terms based on the selected portion of the displayed content. In certain embodiments, the agent initiates a search using the copied elements as search terms. In certain embodiments, the search comprises a search of the network. In certain embodiments, the search comprises a search of the network server. In certain embodiments, the agent is provided by the network resource.

In certain embodiments, the agent identifies an implicit user interaction with one or more elements of the content. In certain embodiments, the agent is operable to present a hyperlink to the user related to the one or more elements of the content. In certain embodiments, the presented hyperlink is related to the network resource. In certain embodiments, the presented hyperlink is associated with a landing page.

Certain embodiments of the invention provide methods of deterring traversal of network domains. In certain embodiments, the method is performed by one or more processors communicatively coupled to the network. Certain embodiments comprise detecting an implicit user interaction with an element of content obtained from a network resource and displayed on a device of the user. In certain embodiments, the implicit user interaction includes a mouse over interaction with the element. In certain embodiments, the implicit user interaction includes a selection of the element. In certain embodiments, the implicit user interaction includes copying the element. Certain embodiments comprise obtaining at least one search term from the element. In certain embodiments, the implicit user interaction occurs in relation to a plurality of words in the element. In certain embodiments, the at least one search term is based on the plurality of words.

Certain embodiments comprise automatically causing a search to be performed using the at least one search term. Certain embodiments comprise displaying one or more selected links on the display device. In certain embodiments, the one or more links are selected based on the at least one search term. In certain embodiments, the one or more selected links comprises at least one result of the search that relates to a domain that includes the network resource.

In certain embodiments, the network resource provides an agent to the user device. In certain embodiments, the agent is configured to cause the user device to detect the implicit user interaction with the element of content. In certain embodiments, there are fewer than eight words in the plurality of words. In certain embodiments, the at least one search term includes the plurality of words. In certain embodiments, the agent is operable to cause the user device to transmit the element of content to a different device. In certain embodiments, the different device extracts the at least one search term from the element of content.

Certain embodiments of the invention provide an agent adapted for use in conjunction with a browser on a user device. In certain embodiments, the agent comprises data and instructions that, when executed by a processor of the user device, cause the user device to perform the method. In certain embodiments, the method comprises causing the agent to detect an implicit user interaction with an element of content provided by the network resource and displayed by the browser. In certain embodiments, the implicit user interaction includes a mouse over interaction. In certain embodiments, the implicit user interaction includes a copying interaction. In certain embodiments, the implicit user interaction includes a selection interaction. In certain embodiments, the method comprises causing the agent to obtain a search term comprising a plurality of words extracted from the element. In certain embodiments, the method comprises causing the agent to automatically cause a search to be performed using the search term. In certain embodiments, the method comprises causing the agent to display one or more selected links including at least one result of the search. In certain embodiments, the one or more links are directed to content provided by a domain that includes the network resource.

In certain embodiments, obtaining the search term includes causing the user device to transmit a portion of the element to a server. In certain embodiments, the server is configured to extract the plurality of words from the portion of the elements. In certain embodiments, the server is configured to generate a search term that includes the plurality of words and information identifying the domain that includes the network resource. In certain embodiments, the agent is transmitted to the user device with the content provided by the network resource.

Certain embodiments of the invention provide a method for monitoring of events likely to cause a user accessing a network resource to depart from the domain of the network resource. Certain embodiments comprise execution of a software application operating within the software environment of a viewing program operating on a user computer. In certain embodiments, the viewing program is capable of viewing resources available in a network (a "network resource"). In certain embodiments, the software application identifies the user electing to copy elements within said network resource. In certain embodiments the copying of elements below a certain threshold number within said network resource, along with the element copied from the network resource, is communicated to a party other than the user. In certain embodiments, elements below a certain threshold number is seven. In certain embodiments, the party other than the user is the publisher, manager or administrator of the network resource.

Certain embodiments of the invention provide systems for monitoring of events likely to cause a user accessing a network resource to depart from the domain of the network resource. Certain embodiments comprise a first computer in electronic communication with a network. Certain embodiments comprise a second computer in electronic communication with a network. In certain embodiments, the network resource resides on the first computer. In certain embodiments, the network resource is received by the second computer and communicated to a user of the second computer by a viewing program. In certain embodiments, the network resource causes the viewing program to access and execute software code which identifies a user interaction with elements of the network resource. In certain embodiments, when a user elects to copy elements below a certain threshold within said network resource, the element copied is communicated to a third computer or to the first computer. In certain embodiments, the elements below a certain threshold number is seven.

Certain embodiments of the invention provide a method of deterring a user accessing a network resource from departing the domain of the network resource. Certain embodiments comprise execution of a software application operating within the software environment of a viewing program operating on a user computer. In certain embodiments, the viewing program capable of viewing resources available in a network (a "network resource"). In certain embodiments, the software application identifying the user electing to copy elements within the network resource. In certain embodiments, the copying of elements below a certain threshold within the network resource, causes the software application to offer to perform a search of network resources using the copied elements as search terms. In certain embodiments, elements below a certain threshold number is seven. In certain embodiments, the search of network resources may be limited to network resources within the domain of the network resource, within a subset of domains containing network resources, or for all generally available network domains.

Certain embodiments of the invention provide system for deterring a user accessing a network resource from departing the domain of the network resource. Certain embodiments comprise a first computer in electronic communication with a network. Certain embodiments comprise a second computer in electronic communication with a network. In certain embodiments, the network resource resides on said first computer. In certain embodiments, the network resource is received by said second computer and communicated to a user of the second computer by a viewing program. In certain embodiments, the network resource causes the viewing program to access and execute software code which identifies a user interaction with elements of the network resource. In certain embodiments, a user elects to copy elements below a certain threshold within the network resource, the software code presents to the user an offer to perform a search of network resources using the copied elements as search terms. In certain embodiments, the elements below a certain threshold number is seven.

Certain embodiments of the invention provide a method for improving a user experience when accessing a network resource. Certain embodiments comprise execution of a software application operating within the software environment of a viewing program operating on a user computer. In certain embodiments, the viewing program capable of viewing resources available in a network (a "network resource"). In certain embodiments, the software application identifying the user electing to copy elements within the network resource. In certain embodiments, the copying of elements below a certain threshold within the network resource, causes the software application to offer to perform a search of network resources using the copied elements as search terms. In certain embodiments, the elements below a certain threshold number is seven. In certain embodiments, the search of network resources may be limited to network resources within the domain of the network resource, within a subset of domains containing network resources, or for all generally available network domains.

Certain embodiments of the invention provide a system for improving a user experience when accessing a network resource. Certain embodiments comprise a first computer in electronic communication with a network. Certain embodiments comprise a second computer in electronic communication with a network. In certain embodiments, the network resource resides on said first computer. In certain embodiments, the network resource is received by the second computer and communicated to a user of the second computer by a viewing program. In certain embodiments, the network resource causes the viewing program to access and execute software code which identifies a user interaction with elements of the network resource. In certain embodiments, when a user elects to copy elements below a certain threshold within the network resource, the software code presents to the user an offer to perform a search of network resources using the copied elements as search terms. In certain embodiments, the elements below a certain threshold number is seven.

Certain embodiments of the invention provide a method for increasing user traffic to a network resource. Certain embodiments comprise execution of a software application operating within the software environment of a viewing program operating on a user computer. In certain embodiments, the viewing program is capable of viewing resources available in a network (a "network resource"). In certain embodiments, the software application identifies the user electing to undertake an implicit user interaction within the network resource. In certain embodiments, the implicit user interaction with elements within the network resource, causes the software application to offer at least one hyperlink to a network resource relating or relevant to the element subject to an implicit user interaction. In certain embodiments, the hyperlink to a network resource relating or relevant to the element subject to an implicit user interaction is a landing page. In certain embodiments, the presentation to a user of at least one hyperlink which leads to a network resource relating or relevant to the element subject to an implicit user interaction is based upon a rate of implicit user interaction of a user with elements within said network resource compared to users accessing the network resource, implicit user interactions with elements within the network resource or other network resources, or frequency of implicit user interaction with elements within the network resource over a selected period of time.

Certain embodiments of the invention provide a system for increasing user traffic to a network resource. Certain embodiments comprise a first computer in electronic communication with a network. Certain embodiments comprise a second computer in electronic communication with a network. In certain embodiments, the network resource resides on said first computer. In certain embodiments, the network resource is received by said second computer and communicated to a user of said second computer by a viewing program. In certain embodiments, the network resource causes the viewing program to access and execute software code which identifies an implicit user interaction with elements of the network resource. In certain embodiments, when a user undertakes an implicit user interaction with elements within the network resource, the software code presents to the user an offer of at least one hyperlink which leads to a network resource relating or relevant to the element subject to an implicit user interaction.

In certain embodiments, the hyperlink to a network resource relating or relevant to the element subject to an implicit user interaction is a landing page. In certain embodiments, the presentation to a user of at least one hyperlink which leads to a network resource relating or relevant to the element subject to an implicit interaction is based upon a rate of implicit user interaction with elements within the network resource as compared to users accessing the network resource, implicit user interactions with elements within the network resource or other network resources, or frequency of implicit user interaction with elements within the network resource over a selected period of time.

Certain embodiments of the invention provide a method for increasing user traffic to a network resource. Certain embodiments comprise executing of a software application operating within the software environment of a viewing program operating on a user computer. In certain embodiments, the viewing program is capable of viewing resources available in a network (a "network resource"). In certain embodiments, the software application identifies the user electing to undertake an implicit user interaction within the network resource. In certain embodiments, the implicit user interaction with elements within said network resource causes the software application to present to a user at least one network resource relating or relevant to the element subject to an implicit user interaction. In certain embodiments, the at least one network resource relating or relevant to the element subject to an implicit user interaction is a landing page. In certain embodiments, the presentation to a user at least one network resource relating or relevant to the element subject to an implicit user interaction is based upon a rate of implicit user interaction of a user with elements within said network resource compared to users accessing the network resource, implicit user interactions with elements within the network resource or other network resources, or frequency of implicit user interaction with elements within the network resource over a selected period of time.

Certain embodiments of the invention provide a system for increasing user traffic to a network resource. Certain embodiments comprise a first computer in electronic communication with a network. Certain embodiments comprise a second computer in electronic communication with a network. In certain embodiments, the network resource resides on said first computer. In certain embodiments, the network resource is received by the second computer and communicated to a user of the second computer by a viewing program. In certain embodiments, the network resource causes the viewing program to access and execute software code which identifies an implicit user interaction with elements of the network resource. In certain embodiments, when a user undertakes an implicit user interaction with elements within said network resource, the software code presents to the user at least one network resource relating or relevant to the element subject to an implicit user interaction.

In certain embodiments, the at least one network resource relating or relevant to the element subject to an implicit user interaction is a landing page. In certain embodiments, the at least one network resource relating or relevant to the element subject to an implicit interaction is based upon a rate of implicit user interaction with elements within the network resource as compared to users accessing the network resource, implicit user interactions with elements within the network resource or other network resources, or frequency of implicit user interaction with elements within the network resource over a selected period of time.

In certain embodiments, the present invention provides a method for identifying trends in user behaviour or interest comprising execution of a software application operating within the software environment of a viewing program operating on a user computer, said viewing program capable of viewing resources available in a network (a "network resource"), said software application identifying the user electing to undertake implicit user interactions within said network resource, wherein the undertaking of an implicit user interaction, along with the element subject to an implicit user interaction within the network resource, is communicated to a party other than the user and wherein the frequency of implicit user interaction with the elements or keywords therein are monitored over time. In a further embodiment the party other than the user is the publisher, manager or administrator of the network resource.

Certain embodiments of the invention provide a system for identifying trends in user behaviour or interest. Certain embodiments comprise a first computer in electronic communication with a network. Certain embodiments comprise a second computer in electronic communication with a network. In certain embodiments, the network resource resides on the first computer. In certain embodiments, the network resource is received by the second computer and communicated to a user of the second computer by a viewing program. In certain embodiments, the network resource causes the viewing program to access and execute software code which identifies an implicit user interaction with elements of the network resource. In certain embodiments, the undertaking of an implicit user interaction, along with the element subject to an implicit user interaction within the network resource, is communicated to a party other than the user and wherein the frequency of implicit user interaction with the elements or keywords therein is monitored over time. In certain embodiments, the element subject to an implicit user interaction is used as input in a trend analysis engine.

While particular embodiments of the present invention have been described in the foregoing, it is to be understood that other embodiments are possible within the scope of the invention and are intended to be included herein. It will be clear to a person skilled in the art that modifications of and adjustments to this invention, not shown, are possible without departing from the spirit of the invention as demonstrated through the exemplary embodiments. The invention is therefore to be considered limited solely by the scope of the appended claims.

What is claimed is:

1. A system for monitoring user interactions with a network resource and for deterring traversal of a network domain, comprising:

a first network computing device in electronic communication with a network, the first network computing device facilitating access to one or more sources of content in a network resource by a user of the network, the one or more sources of content accessible in a single network domain serving as a portal to other network domains, the network resource in a first domain configured to provide an agent to a client device and the client device configured to be responsive to implicit user interactions and to direct the user to content provided by the first domain and sourced by a second domain;

the client device in electronic communication with the network, the client device configured to receive and display content from the one or more sources of content, wherein the client device is operable to detect a copy event initiated by the user associated with a selected portion of displayed content and wherein the agent is transmitted to the client device with the content provided by the network resource;

the agent resident on the client device, the agent provided by the network resource and being configured to copy the selected portion of the displayed content in response to the detected copy event and further configured to cause the selected portion of the displayed content to be transmitted to at least one other computing device in network communication with the client device when the selected portion of the displayed content comprises no more than seven words and the at least one other computing device configured to extract the selected portion of the displayed content, and the at least one other computing device is adapted to analyze the selected portion of the displayed content and to automatically collect data on the user interactions including at least one of 1) a geographic location of a particular user who undertook the copy event; 2) a number of times elements within the network resource are copied; 3) a most copied element within the network resource; 4) a tag cloud of most commonly copied elements in the network resource; and 5) a number of times links generated because of the copy event are viewed by other users to distinguish by their IP addresses.

2. The system of claim 1, wherein the copy event initiated by the user comprises a mouse-over event.

3. The system of claim 1, wherein the network computing device is embodied in a network server.

4. The system of claim 1, wherein the agent generates search terms based on the selected portion of the displayed content.

5. The system of claim 4, wherein the agent initiates a search using copied elements as search terms.

6. The system of claim 4, wherein the search comprises a search of the network.

7. The system of claim 4, wherein the search comprises a search of the network server.

8. The system of claim 1, wherein the agent is provided by the network resource and the network resource being provided on different servers accessed through the portal.

9. The system of claim 8, wherein the agent identifies an implicit user interaction with one or more elements of the one or more sources of content.

10. The system of claim 9, wherein the agent is operable to present a hyperlink to the user related to the one or more elements of the one or more sources of the content.

11. The system of claim 10, wherein the presented hyperlink is related to the network resource.

12. The system of claim 10, wherein the presented hyperlink is associated with a landing page.

13. A method of deterring traversal of network domains, the method being performed by one or more processors communicatively coupled to the network, the method comprising:

detecting an implicit user interaction with an element of content obtained from a network resource and displayed on a device of the user, the network resource provided on different servers accessed through a portal, the network resource configured in a first domain to provide an agent to the device of the user, the agent being provided along with content provided by the network resource, the agent configured to cause the device of the user to detect the implicit user interaction with the element of content provided by the first domain and sourced from a second domain, the implicit user interaction including a mouse over interaction with the element and a selection of the element;

obtaining at least one search term from the element, wherein the implicit user interaction occurs in relation to a plurality of words in the element, wherein the at least one search term is based on the plurality of words and wherein the agent is operable to cause the device of the user to transmit the element of content to a different device and wherein the different device extracts the at least one search term from the element of content;

automatically causing a search to be performed using the at least one search term; and displaying one or more selected links on the display device, wherein the one or more links are selected based on the at least one search term, and wherein the one or more selected links comprises at least one result of the search that relates to a domain that includes the network resource;

wherein the displayed element of content is analyzed and the implicit user interaction data is automatically collected including at least one of 1) a geographic location of a particular user who undertook the copy event; 2) a number of times elements within the network resource are copied; 3) a most copied element within the network resource; 4) a tag cloud of most commonly copied elements in the network resource; and 5) a number of times links generated because of the copy event are viewed by other users as distinguished by their IP addresses.

14. The method of claim 13, wherein the network resource comprises one or more sources of content accessible in a single network domain and provides the agent to the device of the user, the agent being configured to cause the device of the user to detect the implicit user interaction with the element of content.

15. The method of claim 14, wherein there are fewer than eight words in the plurality of words and the at least one search term includes the plurality of words.

16. An agent configured to deter traversal of network domains, operated using one or more computing devices and adapted for use in conjunction with a browser on a user device, the agent comprising data and instructions stored on a non-transitory storage medium that, when executed by a processor of the user device, cause the user device to:

detect an implicit user interaction with an element of one or more sources of content provided by the network resource and displayed by the browser, the one or more sources of content accessible in a single network domain and provided on different servers accessed through a single portal, the network resource in a first domain configured to provide an agent to a client device and the client device configured to be responsive to implicit user interactions and to direct the user to content provided by the first domain and sourced by a second domain and wherein the agent is transmitted to the user device with the content provided by the network resource, the implicit user interaction including at least a copying interaction, a mouse over interaction and a selection interaction;

obtain a search term comprising a plurality of words extracted from the element wherein the element of content is transmitted to a different device wherein the different device extracts at least one search term from the element of content;

automatically cause a search to be performed using the search term; and display one or more selected links including at least one result of the search, wherein the one or more links are directed to content provided by a domain that includes the network resource;

wherein the displayed element is analyzed and the implicit user interaction data is automatically collected including at least one of 1) a geographic location of a particular user who undertook the copy event; 2) a number of times elements within the network resource are copied; 3) a most copied element within the network resource; 4) a tag cloud of most commonly copied elements in the network resource; and 5) a number of times links generated because of the copy event are viewed by other users as distinguished by their IP addresses.

17. The agent of claim 16, wherein obtaining the search term includes causing the user device to transmit a portion of the element to a server, the server being configured to extract the plurality of words from the portion of the elements and to generate a search term that includes the plurality of words and information identifying the domain that includes the network resource.

18. The agent of claim 16, wherein the content provided by the network resource is at least one of textual content, audio content, video content, graphics content, multimedia content, provided by a media server or obtained from a live source.

* * * * *